United States Patent [19]

Nilsson

[11] 4,381,277

[45] Apr. 26, 1983

[54] METHOD FOR PRODUCING CONTAINERS

[75] Inventor: Claes T. Nilsson, Löddeköpinge, Sweden

[73] Assignee: PLM AB, Malmo, Sweden

[21] Appl. No.: 264,425

[22] Filed: May 18, 1981

[30] Foreign Application Priority Data

May 29, 1980 [SE] Sweden ............................... 8004003
Dec. 10, 1980 [SE] Sweden ............................... 8008652

[51] Int. Cl.³ .......................... B29C 17/07; B29D 9/04
[52] U.S. Cl. ..................................... 264/512; 156/229; 264/516; 264/134
[58] Field of Search ............... 264/512, 513, 515, 516, 264/523, 134; 156/229

[56] References Cited

U.S. PATENT DOCUMENTS

| | | | |
|---|---|---|---|
| 4,061,705 | 12/1977 | Marcus | 264/513 |
| 4,254,170 | 3/1981 | Roullet et al. | 264/134 X |
| 4,267,143 | 5/1981 | Roullet | 264/512 X |

OTHER PUBLICATIONS

Research Disclosure, "Laminer Preform for Blow Molding", No, 155, Mar. 1977.

*Primary Examiner*—Jan H. Silbaugh
*Attorney, Agent, or Firm*—Hane, Roberts, Spiecens & Cohen

[57] ABSTRACT

A method for providing a container with one or more layers of barrier material during the production of the container from a thermoplastic. A preform (10) is stretched in its axial direction, generally an amount corresponding to the total axial stretching required for conversion of the preform to a container, after which the stretched preform (11, 13) is provided with one or more barrier layers (12, 14), and the preform is then heated and converted to a container. In one embodiment, the axially stretched preform (15) is produced by assembling axially stretched part-preforms (13a,b) covered with one or more barrier layers. The combined preform is then converted to a container.

10 Claims, 9 Drawing Figures

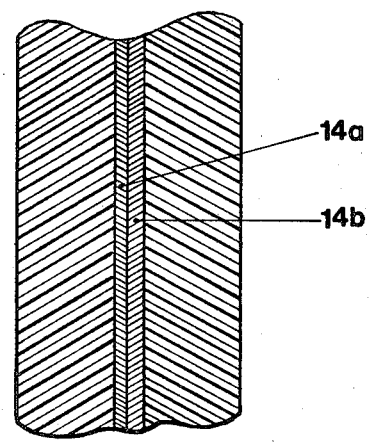
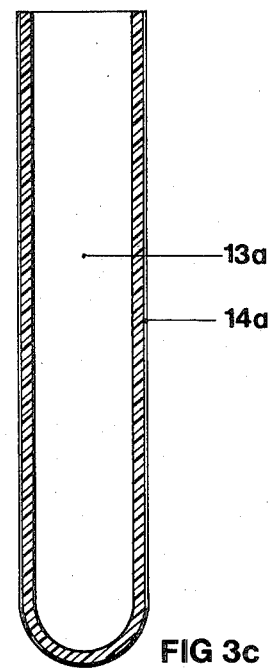
FIG 3f          FIG 3c
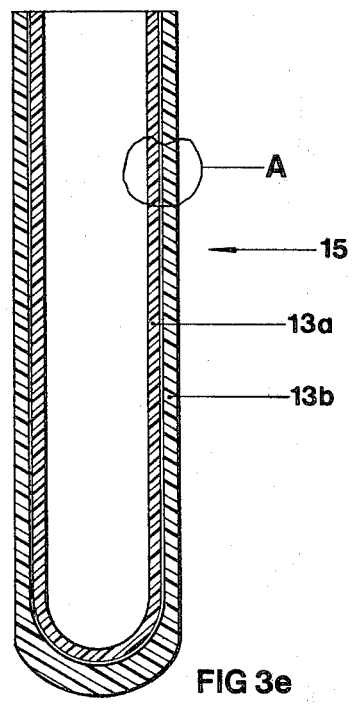
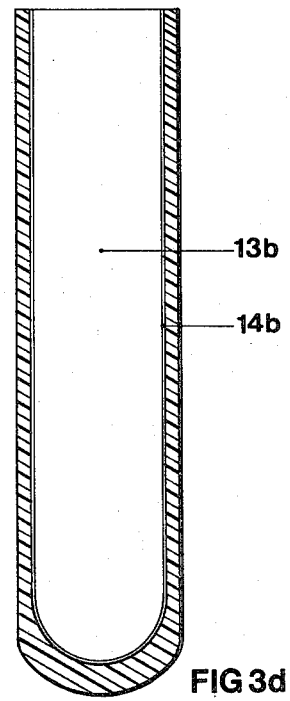
FIG 3e          FIG 3d

METHOD FOR PRODUCING CONTAINERS

FIELD OF THE INVENTION

The present invention relates to a method for producing a container of a thermoplastic material, provided with one or more barrier layers, in the production of which a preform is converted into the container, ad the preform is provided with a barrier layer only after the material in the preform has been stretched in the axial direction of the preform.

PRIOR ART

It has already been disclosed to produce containers, made of thermoplastic material, which are capable of resisting the inner pressure which exists, for example, when storing carbonated drinks, especially such drinks as fruit drinks, cola or beer. By using, for example, polyethylene terephthalate, hereafter referred to as PET, it is possible to produce containers with relatively thin walls.

However, such PET containers with thin walls are permeable to gases such as carbon dioxide. Oxygen from the exterior, as well as light, can also pass through the walls. This behavior has an adverse effect on the contents of the container.

For many applications it is therefore desirable that the container be provided with a layer of barrier material which only allows the passage of gases, or light, to a slight degree. It is known to provide the container with such layers by a number of different techniques. Examples of these are to coat the protective layer onto the finished container, to co-extrude a blank of which one layer consists of protective material, or to coat an inner or outer protective layer onto the preform.

Especially in the case of the technique where the preform is provided with one or more protective layers, problems arise because each protective layer is greatly reduced in thickness during the conversion of the preform to a container. The use of protective layers is, however, necessary in the case of many applications, and therefore a number of solutions to the problem have been developed, in which protective layers of the necessary thickness are applied to the preform prior to its conversion to a container. In this alternative method, the protective layer is applied in a number of steps, for example through repeated dipping, where appropriate with intermediate drying. In another alternative, the liquid in which the preform is dipped is relatively viscous, whilst in a third alternative a coagulating material and an aqueous dispersion produce a suitable film-forming polymer after drying.

A frequently used protective layer is applied as a dispersion of polyvinylidene chloride in water. After application, the mixture is dried at a relatively low temperature to avoid undesirable skinning on the surface of the mixture, which in turn impedes drying, ie. impedes the removal of water from the layer under the surface of the mixture. If a thick protective layer is required, the protective layer is applied in several steps, each new layer being dried as described above.

SUMMARY OF THE INVENTION

An object of the present invention is to provide a method for producing a barrier layer on a container, where the thickness of the barrier layer when applied to the container material is reduced.

According to the invention, the preform is subjected to an axial stretching, generally corresponding to the total axial stretching required for the conversion of the preform to the container, before the barrier layer is applied. In such case, during the conversion to the container, the barrier layer which has been applied is reduced in thickness primarily only in proportion to the stretching of the material transversely to the axial direction. During the conversion of a PET preform to a container, the endeavour is to stretch the material, at least in the actual body of the container, ie. in the cylindrical part in the case of a bottle—biaxially and about 3-fold in each axial direction. As a result of the invention, the thinning-down of the barrier layer applied to the preform is thus reduced from 9-fold to about 3-fold, which greatly simplifies the application of the barrier layer to the preform.

Prior to the conversion of the preform to the finished container, the material of the preform is heated to an appropriate moulding temperature. According to the invention, this heating is, in certain embodiments, allowed to complete the hardening of the applied barrier layer and to complete the bonding, associated therewith, between the material of the stretched preform and the material which forms the barrier layer. The reduction of thickness of the barrier layer on the preform, which the invention achieves, simplifies this procedure.

According to one embodiment of the invention, the preform is produced by placing an inner part-preform into an outer part-preform, the outer diameter of the inner part-preform being only insignificantly less than the inner diameter of the outer part-preform. The barrier layer is applied to the outer surface of the inner part-preform and/or to the inner surface of the outer part-preform, before the two part-preforms are brought together to give the combined preform.

The use of two part-preforms, which form a combined preform with a barrier layer located between the two part-preforms, has the advantages, inter alia, that in the filled container the contents do not come into direct with the barrier layers of the container, and that the barrier material, through being included in the container wall, is not able to detach from any of the surfaces of the container. Particularly in the case of a barrier applied as a coating to the outer surface of the container, it has been found that on storage of carbonated drinks, carbon dioxide passes through the container wall and as a result the barrier layer is prone to detach from the outer surface of the container wall. The inclusion inside the container wall, achieved by the application of the invention, makes this impossible, According to an alternative embodiment of the invention, the two part-preforms are each provided with a barrier layer, one layer preventing the passage of gases and the other the passage of light, or one preventing the passage of oxygen and the other the passage of carbon dioxide. Preferably, the oxygen barrier is applied to the outer part-preform.

In a further alternative embodiment of the invention, one of the part-preforms, preferably the inner part-preform, is provided with two or more barrier layers on top of one another. Since, as a result of the heating of the combined preform, and the subsequent conversion to a container, the barrier layers are in good contact with, and are safely enclosed between, the layers of the material, the function of the barrier layers is safeguarded.

In yet another embodiment, the composite axially stretched preform consists of more than two axially stretched part-preforms which are arranged one within the other. Barrier layers as above are in this case applied to one or more of the part-preforms which together constitute the axially stretched composite preform.

In yet another embodiment, the axially stretched preform, coated with a barrier layer, is used as a part-preform which, together with one or more part-preforms which have not undergone axial stretching, constitutes the composite preform. The abovementioned combination of part-preforms is used particularly when some of the part-preforms are made of a material which cannot be stretched at a relatively low temperature, ie. at a temperature in the region of, or below, the glass transition temperature (TG). It is occasionally necessary to use such material in order to achieve material layers which, in the desired container, provide the required properties in respect to gas penetration, light penetration, reaction with the surrounding atmosphere or with the goods stored in the container, and the like, these properties not being achievable solely by applying barrier layers to the surfaces of the part-preforms or preforms.

It is even possible to apply a print and/or decoration to the outer surfaces of one of the inner part-preforms. The design of the print and/or decoration is in that case adjusted to the stretching of the material which takes place during the subsequent conversion of the preform to a container.

In a preferred embodiment of the invention, the material in the preform or part-preforms is stretched in an axial direction at a temperature close to or in the region of the glass transition temperature (TG). Preferably, the material is stretched by a mechanical procedure, wherein the preforms pass through one or more draw rings which reduce the wall thickness of the preforms and at the same time equalize the outer diameters of the preforms. Such a stretching procedure is described in Swedish Patent Application No. 8004003-3. As a result of the mechanical orientation it is thus easy to achieve an outer diameter for the inner part-preform which exactly matches the inner diameter of the outer part-preform and the changes in the dimensions which the application of barrier layers on the part-preforms entail.

BRIEF DESCRIPTION OF THE VIEWS OF THE DRAWING

The invention is described in more detail in relation to a number of figures, in which.

DETAILED DESCRIPTION

Figure 1:
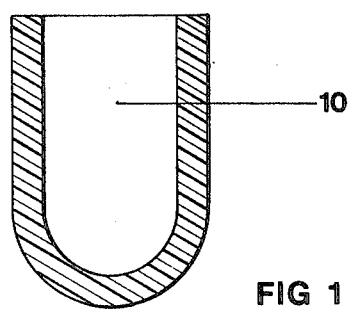
FIG. 1 is a longitudinal section through a preform.
Figure 2A:
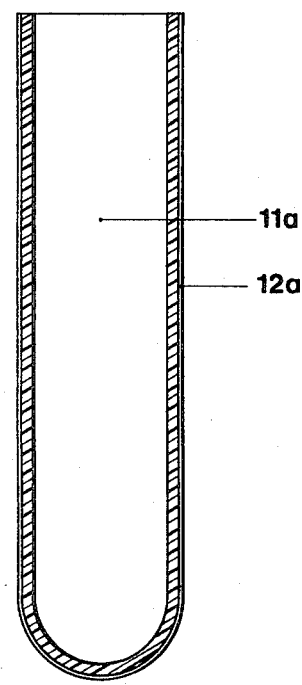
FIG. 2a is a longitudinal section through an axially stretched preform having an outer barrier layer.
Figure 2B:
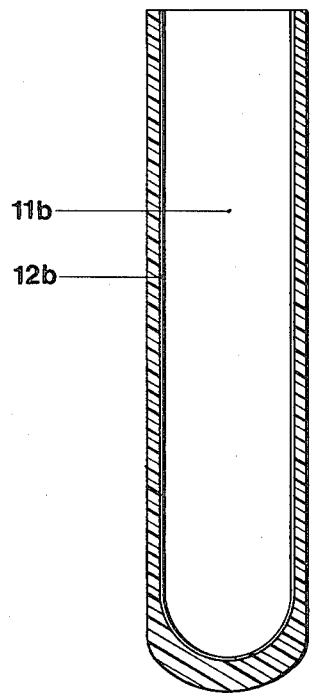
FIG. 2b is a longitudinal section through an axially stretched preform having an inner barrier layer, FIGS. 3a and b are longitudinal sections through preforms intended for subsequent axial stetching, FIGS. 3c and d are longitudinal sections through an axially stretched part-preform with an outer barrier layer (FIG. 3c) and an inner barrier layer (FIG. 3d)

FIGS. 1 and 2 show a preform 10 which, after axial stretching, has resulted in an axially stretched preform 11a or an axially stretched preform 11b with a bottom portion of unstretched material. The material of preform 10 is amorphous. For converting the preform to the axially stretched preform 11, the cylindrical part of the preform is lengthened by a stretching procedure, with simultaneous reduction of the wall thickness. Preferably, this is carried out by passing the preform 10 through one or more draw rings having an internal diameter less than the diameter of the preform prior to such passage. In order to produce the axially stretched preform according to FIG. 2a, the stretching procedure just mentioned is supplemented by stretching the material in the bottom part of the preform. In FIG. 2b, an inner barrier layer 12b has been applied to the stretched preform, whilst in FIG. 2a an outer barrier layer 12a has been applied to the stretched preform.

Figure 3A:
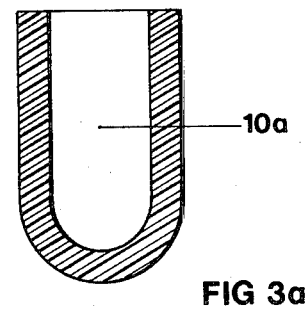
FIG. 3e is a longitudinal section through a preform composed of the two part-preforms shown in FIGS. 3c and d and FIG. 3f is an enlarged section of a detail A in FIG. 3e.
Figure 3B:
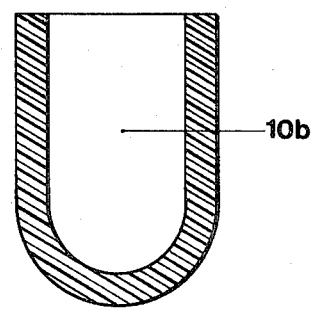

FIGS. 3a-3f show an embodiment of the invention where two preforms, 10a and 10b respectively, are matched to one another so that after completed axial stretching they yield stretched preforms 13a,b of such dimensions that they fit into one another. When the smaller preform 13a is placed in the larger preform 13b, the two preforms yield a composite preform 15. In the figures, the smaller preform 13a is provided with an outer barrier layer 14a and the larger preform 13b with an inner barrier layer 14b. This creates an area in the composite preform, in the transition zone between the two part-preforms, which consists of the two barrier layers 14 a and b. In FIG. 3f, the barrier layers are shown with an exaggerated thickness.

The material in the preforms 11a and 11b or in the composite preform 15 is heated to a shaping temperature and thereafter the preform in question is converted to the container. It is of course possible, before converting the particular preform to a container, to impart at the mouth of the particular preform suitable closure means, such as screw threads and the like, for the finished container. It is also possible, according to the invention, to start with preforms which, before axial stretching, are already provided with such closure means.

In the above description, the axial stretching of the preforms takes place by passing the preforms through draw rings, often of successively diminishing diameter. The invention is obviously applicable also to those production processes where the axial stretching of the preforms takes place by other means. For the embodiment of the invention where axially stretched part-preforms constitute a composite axially stretched preform, it is obviously necessary that appropriate methods of stretching should result in part-preforms with tolerances which allow the part-preforms to fit into one another.

By applying the barrier layers to the axially stretched preforms, the layers are applied to a surface which, for a finished container of a given size, is considerably greater than the area of application in the techniques used hitherto, where unstretched preforms are covered with a barrier layer. When using, for instance, PET, it is for many applications desired to have biaxial orientation of the material, which is achieved by stretching the material at least about 3-fold in one of the axial directions. As a result the material acquires, inter alia, the mechanical properties required for the particular applications. 3-fold stretching of the material in each axial direction means that the ratio of the surface of the preform to the surface of the container is 1:9, which in turn means that the thickness of the barrier layer applied to the preform is reduced in the same ratio. In certain applications, the required properties are achieved by about 3-fold monoaxial stretching, followed by lesser transverse stretching. In applications where the stretching ratios just mentioned are employed, the invention has the effect that the barrier layer thickness is reduced at most 3-fold, which in turn has the advantage that the barrier layer of the preform does not have to be as thick as when using the technique previously employed. As the application of thick barrier layers is a difficult part of the production of containers, the invention provides a considerable simplification of the production process.

Especially when using a composite preform, it is, in certain applications, advantageous to let the final hardening as well as the bonding of the barrier layer to the material of the part-preform take place after the two part-preforms are placed inside one another. If the barrier layer is hardened when the part-preforms have been placed inside one another, and preferably simultaneously with heating the preform to the moulding temperature of the material, good contact between the barrier layers is achieved. Even if only one barrier layer is used, good contact with the material of the part-preform which does not carry the barrier layer is achieved by the procedures as mentioned.

According to the invention, one or several barrier layers are applied to the respective preforms by dipping in a solution containing a barrier material. In an alternative embodiment, the barrier layer is sprayed onto the preform. Other coating processes can of course also be employed within the scope of the invention.

The production of an axially stretched preform 11, 13,15 of polyethylene terephthalate starts with a preform 10 $a,b$. The material in this preform will have a crystallinity less than 10% and preferably less than 5%. In one single operation or a number of consecutive operations the thickness of the material in the preform is reduced to approximately ⅓ of its original thickness. This reduction in thickness takes place either along the entire length of the preform or in one or more sections of the preform. Use is made of a draw ring in which the relationship between the internal circumference of the draw ring and the external circumference of the perform is such that the thickness of the material will be reduced as the draw ring is moved axially along the preform. The temperature of the material immediately before the reduction in thickness takes place must be in the range of or lower than the glass transition temperature (TG) of the material, which temperature will be abbreviated to TG in the following, and should deviate from TG preferably by no more than 15° C. Although the technical effect of the present invention may be achieved at a much lower temperature, it is advantageous to use an initial temperature close to TG, for instance a temperature which is between 1° to 3° C. below TG, since material at this initial temperature will permit the draw ring to be moved at high speed. In certain typical applications, the draw ring operates in conjunction with an internal shaping device located inside the preform, whereby the external dimension of the shaping device fits the internal surface of the preform. In other applications only the internal shaping device is used. The thickness of the material in the preform is reduced by contact with the draw ring and/or the internal shaping device as said draw ring and/or shaping device is moved axially along the preform. During the re-shaping operation a transitional zone is formed between material of the original thickness and material with reduced thickness, said transitional zone gradually moving axially along the preform. The material in the transitional zone is kept at a temperature close to TG during the re-shaping operation by the transfer of heat to the draw ring and/or the shaping device located inside the tubular preform. In certain applications the material in the transitional zone is, however, allowed to assume a temperature which exceeds TG by no more than 30° C., and preferably by no more than 15° C.

In certain applications the material in the area adjacent to the transitional zone is cooled to a temperature below TG immediately after it has been reduced in thickness.

In accordance with the present invention the possibility is offered of producing an axially stretched preform with mainly a monoaxial orientation and in which the material has been reduced in thickness and whose external circumference has been reduced and/or the internal circumference has been increased compared to the circumference of the corresponding sections of material in the preform.

The invention also contains the possibility of further increasing the crystallinity by heating the material, over and above the crystallinity which is produced in the material in conjunction with the monoaxial orientation. This crystallinity should not be allowed to continue to such a point that the ability of the material to undergo further re-shaping is impaired. The crystallinity of PET is normally allowed to reach a maximum level of approximately 30% when the preform is to undergo further re-shaping. Crystallinity is preferably allowed to lie between 10–25%, whereas the crystallinity produced by monoaxial orientation will achieve a maximum value of approximately 17%.

The crystallinity values stated in the present application relate to the theories disclosed in the publication "Die Makromolekulare Chemie" 176, 2459–2465 (1975).

It has been assumed in the above description that the reduction in the thickness of the material until it reaches its final value takes place in a single reduction stage. The invention also contemplates the possibility of reducing the thickness of the material in a number of consecutive reduction stages, before finally reducing the thickness of the material, in the case of PET, to approximately ⅓ of its original thickness in a final stage. In this case the draw ring or draw rings will consist of a number of ring sections for the consecutive gradual reduction of the thickness of the material. The embodiment described in this paragraph is used mainly when the material in the preform has a large wall thickness and/or when the draw rings are moved at high speed.

Tubular preforms of circular cross-section have been shown in the above description. The invention may, of course, also be applied to tubular preforms of other cross-sections.

A large number of materials of the polyester or polyamide type are known to exist, however, and to have similar characteristics. The invention as such is also applicable either in whole or in part to these materials, provided that the reductions in thickness and the temperatures are adjusted to suit the specific requirements of the respective material. The following are typical materials for which the present invention is suitable, after the indicated adjustments have been made: polyethylene terephthalate, polyhexamethylene adipamide, polycaprolactam, polyhexamethylene sebacamide, polyethylene-2,6- and 1,5-naphthalate, polytetramethylene-1,2-dioxybenzoate, and copolymers of ethylene terephthalate, ethylene isophthalate, and other similar plastics polymers.

I claim:

1. A method for producing a barrier-coated container of a thermoplastic material from a preform, said method comprising stretching a preform of amorphous thermoplastic material axially while reducing the wall thickness of the preform to form an axially stretched preform having monoaxially oriented crystallinity, applying a barrier layer on the axially stretched preform, heating the thus coated preform to a molding temperature therefor and circumferentially expanding the axially stretched and coated preform to form the barrier-coated container, wherein said axial stretching represents the total axial stretching of the preform and said barrier layer only undergoes circumferential expansion and corresponding reduction in thickness.

2. A method as claimed in claim 1 wherein said barrier layer is applied by dipping the axially stretched preform into a solution containing the barrier material.

3. A method as claimed in claim 1 wherein final bonding between the material of the axially stretched preform and said barrier layer is effected by said heating of the preform prior to the circumferential expansion to form the container.

4. A method as claimed in claim 1 wherein the preform is axially stretched by a mechanical procedure comprising passing the preform through at least one draw ring to reduce the wall thickness and at the same time reduce the outer circumference of the preform.

5. A method as claimed in claim 1 comprising providing a second preform of tubular shape, inserting one preform into the other, whereafter the thus assembled preforms are heated and circumferentially expanded.

6. A method as claimed in claim 5 wherein said barrier layer on the first preform faces the second preform in the assembled state of the preforms.

7. A method as claimed in claim 1 wherein said thermoplastic material is polyethylene terephthalate and in amorphous state has a crystallinity of less than 10% and in axially stretched state has a monoaxial crystallinity of between 10 and 25%.

8. A method as claimed in claim 7 wherein said crystallinity in the amorphous state is less than 5% and the monoaxial crystallinity in the axially stretched state is a maximum of 17%.

9. A method as claimed in claim 8 wherein the axial stretching of the preform is effected by engaging a mechanical shaping device with a transitional zone between thicker and thinner material of the preform to move said transitional zone along the preform while simultaneously elongating the preform in the direction of movement of the transitional zone such that the reduced wall thickness of the material has a thickness corresponding to the thickness of a sheet of amorphous material upon monoaxial stretching to yielding of said sheet of a thickness equal to the initial wall thickness of the preform at a temperature equal to the temperature of the preform.

10. A method as claimed in claim 8 wherein the axial stretching of the preform is effected by engaging a mechanical shaping device with the preform to form a transitional zone between thicker and thinner material of the preform and to move said transitional zone along the preform while simultaneously elongating the preform in the direction of movement of the transitional zone such that the reduced wall thickness of the material has a thickness corresponding to the thickness of a sheet of amorphous material upon monoaxial stretching to yielding of said sheet of a thickness equal to the initial wall thickness of the preform at a temperature equal to the temperature of the preform.

* * * * *